(12) United States Patent
Kang

(10) Patent No.: US 11,752,879 B2
(45) Date of Patent: Sep. 12, 2023

(54) APPARATUS AND METHOD FOR CONTROLLING PITCH REDUCTION

(71) Applicants: Hyundai Motor Company, Seoul (KR); Kia Corporation, Seoul (KR)

(72) Inventor: Sheen Gil Kang, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 183 days.

(21) Appl. No.: 17/347,942

(22) Filed: Jun. 15, 2021

(65) Prior Publication Data

US 2022/0041061 A1 Feb. 10, 2022

(30) Foreign Application Priority Data

Aug. 4, 2020 (KR) .................. 10-2020-0097471

(51) Int. Cl.
*B60L 15/20* (2006.01)
*B60W 40/11* (2012.01)
*B60W 10/08* (2006.01)

(52) U.S. Cl.
CPC ............ *B60L 15/20* (2013.01); *B60W 10/08* (2013.01); *B60W 40/11* (2013.01);
(Continued)

(58) Field of Classification Search
CPC ............... B60L 15/20; B60L 2240/16; B60L 2240/423; B60L 2240/461; B60L 2260/44; B60L 15/2081; B60L 15/2018; B60W 10/08; B60W 40/11; B60W 2520/105; B60W 2520/28; B60W 40/107;
(Continued)

(56) References Cited

U.S. PATENT DOCUMENTS 8,706,338 B2 * 4/2014 Ichinose ................ B60L 15/20
 701/84
10,118,609 B2  11/2018 Momose
(Continued)

FOREIGN PATENT DOCUMENTS

AU  2009243480 A1 *  7/2010  ............ B60L 15/20
JP  2016025783 A  *  2/2016
JP  6233608 B2  11/2017

OTHER PUBLICATIONS

Fujimoto et al.; Pitching Control Method Based on Quick Torque Response for Electric Vehicle; 2010 Intl. Power Electronics Conf.; ECCE ASIA; Sapporo, Japan; 2010; pp. 801-806 (Year: 2010).*

*Primary Examiner* — Michael J Zanelli

(74) *Attorney, Agent, or Firm* — MORGAN, LEWIS & BOCKIUS LLP

(57) ABSTRACT

An apparatus and a method for controlling pitch reduction may include a sensor device that measures a wheel speed and a longitudinal acceleration of a vehicle, a pitch rate estimation device that performs pseudo-integral of a difference between a wheel acceleration determined from the wheel speed and the longitudinal acceleration to determine an estimation value of a pitch rate, and a pitch motion reduction controller that generates a control command for implementing a motor torque in which the determined estimation value of the pitch rate is reflected and transmits the control command to an electric motor of the vehicle.

16 Claims, 8 Drawing Sheets

(52) U.S. Cl.
CPC ..... *B60L 2240/16* (2013.01); *B60L 2240/423* (2013.01); *B60L 2240/461* (2013.01); *B60L 2260/44* (2013.01); *B60W 2520/105* (2013.01); *B60W 2520/28* (2013.01)

(58) Field of Classification Search
CPC .............. B60W 2050/001; B60W 2050/0052; B60W 2710/083; B60W 2720/106; B60W 2720/16; Y02T 10/64; Y02T 10/72; B60Y 2400/3032
See application file for complete search history.

(56) References Cited

U.S. PATENT DOCUMENTS

| | | | |
|---|---|---|---|
| 2009/0085309 A1* | 4/2009 | Hirao | B60G 17/015 |
| | | | 280/5.503 |
| 2010/0161164 A1* | 6/2010 | Ichinose | B60L 15/20 |
| | | | 701/22 |
| 2017/0101087 A1 | 4/2017 | Momose | |

* cited by examiner

APPARATUS AND METHOD FOR CONTROLLING PITCH REDUCTION

CROSS-REFERENCE TO RELATED APPLICATION

The present application claims the benefit of priority to Korean Patent Application No. 10-2020-0097471, filed on Aug. 4, 2020, the entire contents of which is incorporated herein for all purposes by this reference.

BACKGROUND OF THE INVENTION

Field of the Invention

The present invention relates to an apparatus and a method for controlling pitch reduction, and more particularly, relates to an apparatus and a method for controlling pitch reduction to reduce a pitch motion generated when a vehicle is traveling using a pitch rate estimated at high accuracy in an acceleration and deceleration situation where the vehicle changes in acceleration.

Description of Related Art

Because it is possible for an electric motor provided in an electrification vehicle in the spotlight recently as a means for replacing the internal combustion engine to assign a braking force as well as a driving force, a pitch motion of the vehicle may be controlled when using a required braking force necessary for braking.

The pitch motion refers to a motion of the vehicle suffering from a road surface input of a protruded structure such as a speed bump while driving. Because the shorter the wheelbase of a small vehicle, the larger the pitch motion, the pitch motion has an influence on characteristics of various devices loaded into the vehicle as well as the riding quality of a passenger.

Thus, as one of many efforts for reducing such pitch motion, recently, there has been an attempt to estimate a pitch rate from information related to a wheel speed sensor and perform control in the direction of reducing the estimated pitch rate.

However, when the pitch rate is estimated based on the measurement value of the wheel speed sensor, because the vehicle speed, which varies with an acceleration and deceleration situation of the vehicle, that is, when the acceleration of the vehicle is not kept constant, is reflected in the measurement value of the wheel speed sensor, the estimation value of the pitch rate is inaccurate and the efficiency of pitch reduction control based on it is greatly degraded.

Furthermore, in an existing technology, because of using a pitch/bounce dynamic model in performing pitch reduction control according to the result of estimating the pitch rate, the amount of calculation is excessively increased. When some of several parameters of a pitch/dynamic model are changed due to an unexpected reason, performance of the pitch reduction control is varied by the influence thereof.

Thus, there is a need for a control means capable of estimating a pitch rate at high accuracy in an acceleration and deceleration situation where acceleration of the vehicle is changed and stably reducing pitch motion the vehicle suffers, while maintaining a robust result with respect to various vehicle parameters capable of causing bounce of the vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for controlling pitch reduction to obtain a difference between a longitudinal acceleration and a wheel acceleration, which is an integral target, using the wheel speed and the longitudinal acceleration, respectively measured by a wheel speed sensor and a longitudinal acceleration sensor, correct an offset component and a gravity acceleration component caused by inflection of the longitudinal acceleration, and perform pseudo-integral of the corrected value to determine an estimation value of a pitch rate $\dot{\theta}$ to accurately estimate the pitch rate in an acceleration motion situation where the vehicle accelerates and decelerates, suitably determine a motor torque using the result, and reduce a pitch motion in the acceleration and deceleration situation of the vehicle.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains.

According to various aspects of the present invention, an apparatus of controlling pitch reduction may include a sensor device that measures a wheel speed $v_w$ and a longitudinal acceleration $a_x$ of a vehicle, a pitch rate estimation device that performs pseudo-integral of a difference between a wheel acceleration $\dot{v}_w$ determined from the wheel speed $v_w$ and the longitudinal acceleration $a_x$ to determine an estimation value of a pitch rate, and a pitch motion reduction controller that generates a control command for implementing a motor torque in which the determined estimation value $\hat{\dot{\theta}}$ of the pitch rate $\dot{\theta}$ is reflected and transmits the control command to an electric motor of the vehicle.

In various exemplary embodiments of the present invention, the sensor device may include a wheel speed sensor that measures the wheel speed $v_w$ of the vehicle and a longitudinal acceleration sensor that measures the longitudinal acceleration $a_x$ of accelerating or decelerating the vehicle by acting parallel in a direction where the vehicle is traveling.

In various exemplary embodiments of the present invention, the pitch rate estimation device may include a wheel acceleration determining device that differentiates the wheel speed $v_w$ to determine the wheel acceleration $\dot{v}_w$.

In various exemplary embodiments of the present invention, the pitch rate estimation device may further include an acceleration difference determining device that determines a difference ($u=a_x-\dot{v}_w$) in acceleration by subtracting the wheel acceleration from the longitudinal acceleration.

In various exemplary embodiments of the present invention, the pitch rate estimation device may further include an arithmetic mean subtracting device that subtracts ($u-\bar{u}$) the arithmetic mean for the difference in acceleration from the difference in acceleration.

In various exemplary embodiments of the present invention, the pitch rate estimation device may further include a pseudo-integral performing device that performs pseudo-integral of the result ($u-\bar{u}$) of subtracting the arithmetic mean for the difference in acceleration from the difference in acceleration and divides the integral result by a distance $d_w$ in a vertical direction from the center of the wheel to a longitudinal acceleration sensor to determine the estimation value of the pitch rate $\hat{\dot{\theta}}$.

In various exemplary embodiments of the present invention, the pitch motion reduction controller may multiply a pitch reduction control gain $K_p$ by the estimation value $\hat{\dot{\theta}}$ of the pitch rate determined by performing the pseudo-integral in the pitch rate estimation device to determine a value of the motor torque to drive the electric motor.

According to various aspects of the present invention, a method for controlling pitch reduction may include measuring a wheel speed $v_w$ and a longitudinal acceleration $a_x$ of a vehicle which is traveling, performing pseudo-integral of a difference between a wheel acceleration $\dot{v}_w$ determined from the wheel speed $v_w$ and the longitudinal acceleration $a_x$ to determine an estimation value of a pitch rate, and generating a control command for implementing a motor torque determined based on the determined estimation value $\hat{\dot{\theta}}$ of the pitch rate $\dot{\theta}$ and transmitting the control command to an electric motor of the vehicle.

In another exemplary embodiment of the present invention, the determining of the estimation value of the pitch rate may include differentiating the wheel speed $v_w$ to determine the wheel acceleration.

In another exemplary embodiment of the present invention, the determining of the estimation value of the pitch rate may further include determining a difference ($u=a_x-\dot{v}_w$) in acceleration by subtracting the wheel acceleration from the longitudinal acceleration.

In another exemplary embodiment of the present invention, the determining of the estimation value of the pitch rate may further include subtracting ($u-\bar{u}$) the arithmetic mean for the difference in acceleration from the difference in acceleration.

In another exemplary embodiment of the present invention, the determining of the estimation value of the pitch rate may further include performing pseudo-integral of the result ($u-\bar{u}$) of subtracting the arithmetic mean for the difference in acceleration from the difference in acceleration and dividing the integral result by a distance $d_w$ in a vertical direction from the center of the wheel to a longitudinal acceleration sensor to determine the estimation value of the pitch rate.

In another exemplary embodiment of the present invention, the generating of the control command the transmitting of the control command to the electric motor of the vehicle may include multiplying a pitch reduction control gain $K_p$ by the estimation value $\hat{\dot{\theta}}$ of the pitch rate $\dot{\theta}$ determined by the pseudo-integral to determine a value of a motor torque M driving the electric motor and generating the control command configured for implementing the determined value of the motor torque M and transmitting the control command to the electric motor.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
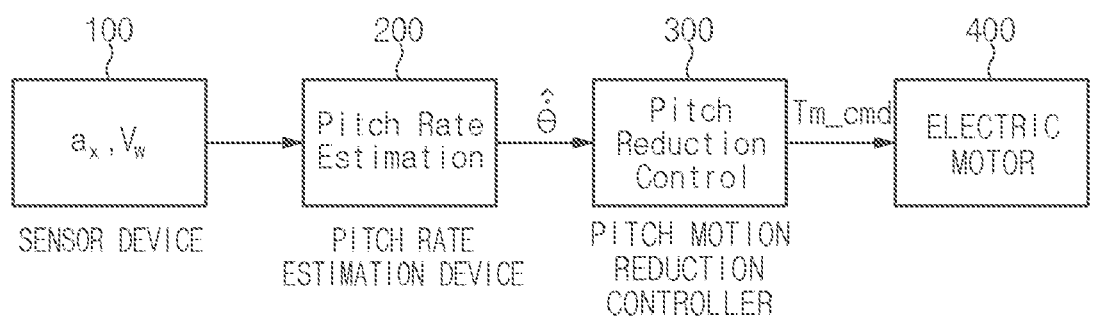
FIG. 1 is a block diagram illustrating a configuration of an apparatus of controlling pitch reduction according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIG. 1, FIG. 2, FIG. 3, FIG. 4, FIG. 5, FIG. 6, FIG. 7, and FIG. 8.

Figure 2:
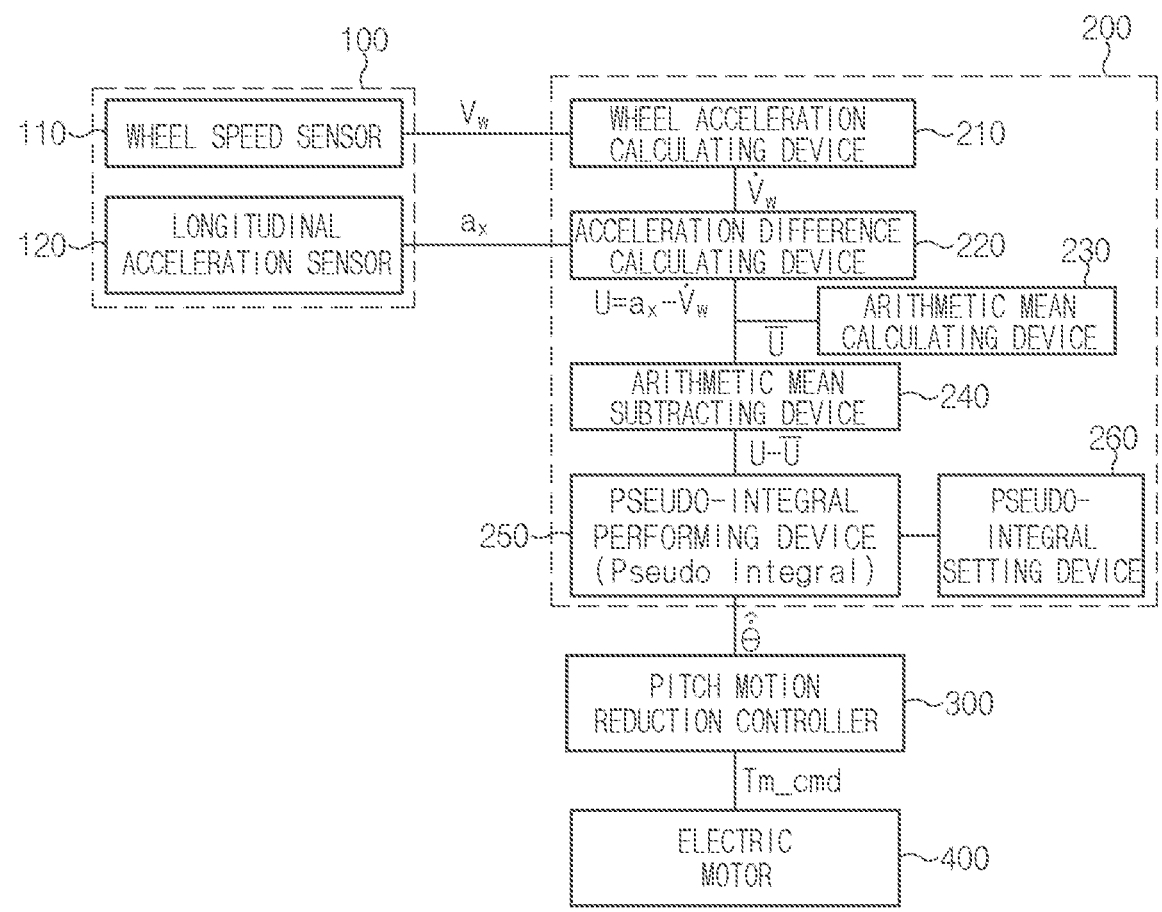
FIG. 2 is a block diagram illustrating in detail a configuration of an apparatus of controlling pitch reduction according to various exemplary embodiments of the present invention.

FIG. 1 is a block diagram illustrating a configuration of an apparatus of controlling pitch reduction according to various exemplary embodiments of the present invention. FIG. 2 is a block diagram illustrating in detail a configuration of an apparatus of controlling pitch reduction according to various exemplary embodiments of the present invention.

Referring to FIG. 1 and FIG. 2, the apparatus of controlling the pitch reduction according to various exemplary embodiments of the present invention may include a sensor device 100 for measuring a wheel speed and a longitudinal acceleration of a vehicle, a pitch rate estimation device 200 for performing pseudo-Integral of a difference between a wheel acceleration determined from the wheel speed and the longitudinal acceleration to determine an estimation value of a pitch rate, and a pitch motion reduction controller 300 for generating a control command for implementing a motor torque in which the determined estimation value of the pitch rate is reflected and transmitting the control command to an electric motor 400 of the vehicle.

The sensor device 100 may include a wheel speed sensor 110 for measuring the wheel speed $v_w$ of the vehicle and a longitudinal acceleration sensor 120 for measuring the longitudinal acceleration $a_x$ of acting parallel in a direction where the vehicle is traveling to accelerate or decelerate the vehicle. Accordingly, the wheel speed $v_w$ and the longitudinal acceleration $a_x$ measured by the sensor device 100 may be transmitted to the pitch rate estimation device 200 to be used as measurement data for estimating the pitch rate.

Figure 3:
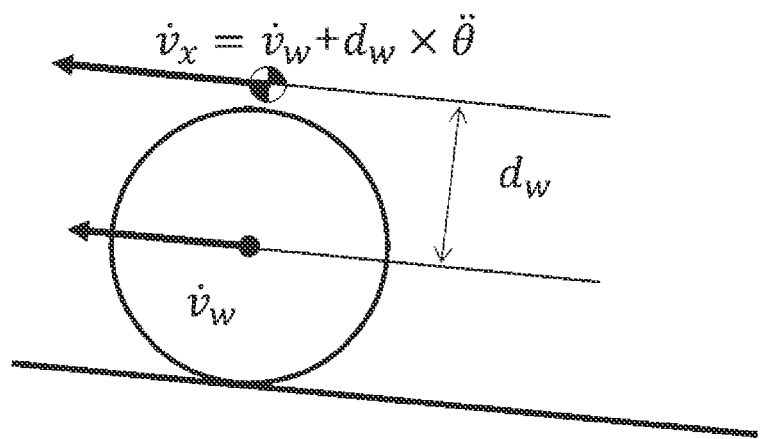
FIG. 3 is a schematic diagram illustrating a kinematic relation between a wheel acceleration and a longitudinal acceleration according to various exemplary embodiments of the present invention.

In the instant case, the wheel speed $v_w$ may be estimated as, as shown in FIG. 3, a speed where the center of the wheel moves along a progress direction of the vehicle, and the longitudinal acceleration $a_x$ may be measured as acceleration of accelerating or decelerating a motion of the vehicle in a direction parallel in a direction where the vehicle is traveling.

Herein, the longitudinal acceleration sensor 120 may measure a gravity component caused by a slope of the road surface on which the vehicle is traveling, in a state where the gravity component is reflected in the longitudinal acceleration $a_x$. To accurately measure the pitch rate, the pitch rate estimation device 200 may need to correct such a gravity component.

Furthermore, the pitch rate estimation device 200 may receive the longitudinal acceleration $a_x$ as wheel as the wheel speed $v_w$ as default measurement data for estimating a pitch rate such that the longitudinal acceleration $a_x$ may be reflected in a determination process, thus considering an acceleration and deceleration situation of the vehicle, which is generated while driving, in pitch rate estimation.

To this end, the pitch rate estimation device 200 may include a wheel acceleration determining device 210 which differentiates the wheel speed $v_w$ to determine the wheel acceleration $\dot{v}_w$.

As shown in the schematic drawing shown in FIG. 3, in general, the acceleration $\dot{v}_x$ where the center of mass of the vehicle moves may be represented as a relationship between the wheel acceleration $\dot{v}_w$ and the pitch acceleration $\ddot{\theta}$ in Equation 1 below. Herein, $d_w$ denotes the distance in the vertical direction from the center of the wheel to the longitudinal acceleration sensor, and $\dot{v}_w$ denotes the wheel acceleration obtained by differentiating the arithmetic mean value of the wheel speeds measured from four wheels of the vehicle.

$$\dot{v}_x = \dot{v}_w + d_w \times \ddot{\theta} \quad \text{[Equation 1]}$$

In the instant case, because the longitudinal acceleration $a_x$ measured by the longitudinal acceleration sensor 120 is measured in a state where gravity components as many as the vehicle is tilted by a slope of a road surface or the like are reflected as well as an acceleration value by longitudinal acceleration motion in a direction where the vehicle is traveling, it may be actually represented with the gravity components as Equation 2 below. In the instant case, $\theta$ denotes the pitch angle and $\ddot{\theta}$ denotes the pitch acceleration.

$$a_x = \dot{v}_w + d_w \times \ddot{\theta} - g \times \theta \quad \text{[Equation 2]}$$

Accordingly, obtaining the pitch acceleration $\ddot{\theta}$ by the longitudinal acceleration relationship in which the longitudinal acceleration motion of the vehicle and the gravity component thereof are added, it may be derived as Equation 3 below.

In the instant case, because $g \times \theta$ term associated with the gravity component is able to be regarded as "0" when the pitch angle $\theta$ is small, the pitch acceleration $\ddot{\theta}$ may be obtained in a form of being proportional to a relationship between the longitudinal acceleration $a_x$ measured by the longitudinal acceleration sensor 120 and the wheel acceleration $\dot{v}_w$ determined by differentiating the wheel speed $v_w$ measured by the wheel speed sensor 110. Such the pitch acceleration $\ddot{\theta}$ may be integrated to obtain the pitch rate $\dot{\theta}$.

$$\ddot{\theta} = \frac{1}{d_w} \times (a_x - \dot{v}_w) \quad \text{[Equation 3]}$$

However, when the pitch acceleration $\ddot{\theta}$ including the measurement value $a_x$ in the longitudinal acceleration sensor 120 is integrated to obtain the pitch rate $\dot{\theta}$, the integrated value may continue increasing to diverge due to an offset problem the longitudinal acceleration sensor itself has chronically.

Furthermore, when a mounting state where the longitudinal acceleration sensor 120 is loaded into the vehicle is in disorder or when the height of the vehicle varies with a location of a passenger who rides in the vehicle or a location of a load, a pitch angle of the vehicle may be measured as being not "0". Due to the provided configuration, although the real acceleration of the vehicle is "0" and although the vehicle is in uniform motion, a certain value may be measured by inflecting the gravity component. When the vehicle is traveling on a slope road, the gravity component may be measured by a slope angle and a difference may be generated in a value determined by the gravity component.

Accordingly, when the pitch rate is estimated using the longitudinal acceleration $a_x$ measured by the longitudinal acceleration sensor 120 and when the speed of the vehicle is changed due to acceleration and deceleration, the change in speed may be reflected to estimate the pitch rate at high accuracy. However, as described above, problems which may occur by use of the longitudinal acceleration $a_x$ to estimate the pitch rate may be caused together.

Thus, rather than integrating the pitch acceleration $\ddot{\theta}$ itself derived as Equation 3 above, the pitch rate estimation device 200 may perform pseudo-integral in a state where components caused by offset, gravity, or the like are corrected in advance to accurately estimate the pitch rate.

To this end, the pitch rate estimation device 200 may further include an acceleration difference calculating device 220 for determining a difference u between the wheel acceleration $\dot{v}_w$ and the longitudinal acceleration $a_x$.

Such an acceleration difference calculating device 220 may perform pitch residual determination of subtracting the wheel acceleration $\dot{v}_w$ from the longitudinal acceleration $a_x$ in Equation 4 below to determine the difference u in acceleration. Accordingly, the difference between the longitudinal acceleration and the wheel acceleration, which is determined by the acceleration difference determining device 220, may be a component caused by a pitch motion the vehicle suffers.

$$u = a_x - \dot{v}_w \quad \text{[Equation 4]}$$

In the instant case, the pitch rate estimation device 200 may further include a notch filter 270 for passing the result of the difference u in acceleration determined by the acceleration difference calculating device 220 through a specific frequency band to remove a vibration component caused by vibration in a vertical direction of a tire. The specific frequency band to be removed by the notch filter 270 is set to about 12 Hz in the exemplary embodiment of the present invention, but it is obvious that the frequency band is not limited to the specific frequency band may be set in various manners.

Before the determination in the acceleration difference calculating device 220 proceeds, it is obvious that the determination may proceed after the longitudinal acceleration $a_x$ and the wheel acceleration $\dot{v}_w$ pass through a low pass filter 280 to remove noise in advance.

Furthermore, the pitch rate estimation device 200 may further include an arithmetic mean calculating device 230 for determining an arithmetic mean $\bar{u}$ for an acceleration difference during a certain interval.

Accordingly, the arithmetic mean calculating device 230 may perform DC component determination of the arithmetic mean $\bar{u}$ for the difference in acceleration to obtain a component caused by a DC offset of the longitudinal acceleration sensor itself in a state where there is not pitch motion and a gravity acceleration suffering due to an error where the longitudinal acceleration sensor 120 is mounted, driving on a slope road, or the like.

Furthermore, the pitch rate estimation device 200 may further include an arithmetic mean subtracting device 240 for subtracting the arithmetic mean $\bar{u}$ from the difference u in acceleration.

In other words, the pitch motion is a phenomenon caused for a relatively short time, but a phenomenon suffering over a relatively wide interval by a DC offset component and a gravity acceleration component caused by an error in mounting or a slope road is reflected together with the pitch motion for the short time period in the difference u between the longitudinal acceleration and the wheel acceleration.

Thus, there is a need to remove phenomena caused by other components except for the pitch motion in advance before performing integral to improve accuracy of the pitch rate estimation value. To this end, the arithmetic mean subtracting device 240 may perform correction $(u-\bar{u})$ of subtracting an arithmetic mean $\bar{u}$ for a difference between the longitudinal acceleration and the wheel acceleration, which are measured in a wider interval than the pitch motion, from the current measured difference u between the longitudinal acceleration and the wheel acceleration, thus minimizing that the offset component or the gravity acceleration component is reflected in the pitch rate estimation value.

In the instant case, the interval for determining the arithmetic mean $\bar{u}$ is set to about 1 second in the exemplary embodiment of the present invention, but it is obvious that the interval may be differently set without being limited to such a setting value.

When the pitch rate estimation device 200 performs the integral without removing the offset component or the gravity acceleration component, it may be difficult to accurately estimate the pitch rate because the integral output diverges and is saturated due to accumulation of the offset component or the like over time. Thus, the arithmetic mean subtracting device 240 may remove such an offset component or the like in advance to perform correction and integral, thus accurately estimating the pitch rate when it is used for a long time.

Furthermore, the pitch rate estimation device 200 may further include a pseudo-integral performing device 250 for performing pseudo-integral of the result of subtracting the arithmetic mean $\bar{u}$ for the difference between the longitudinal acceleration and the wheel acceleration from the currently measured difference u between the longitudinal acceleration and the wheel acceleration and dividing the integral result by a distance $d_w$ in a vertical direction from the center of the wheel to the longitudinal acceleration sensor 120 to determine the estimation value of the pitch rate $\dot{\theta}$, in Equation 5 below.

In Equation 5 below, obtaining the estimation value $\hat{\dot{\theta}}$ of the pitch rate by the integral is represented in a form of a transfer function. In Equation 5 below, c denotes the certain constant as a value configured for being set by the tuning element.

$$\hat{\dot{\theta}} = \frac{1}{d_w} \times \frac{(u - \bar{u})}{s + c} \quad \text{[Equation 5]}$$

In the instant case, the difference u between the longitudinal acceleration and the wheel acceleration, which is an integral target, may be the same as that in Equation 4 and may be the same as a component forming the pitch acceleration in Equation 3 above. Herein, when the pitch acceleration $\ddot{\theta}$ based on Equation 3 above is determined in a form of pure integral, the result may be represented in a form of divergence. The form of such divergence may fail to provide an estimation value suitable for the pitch rate necessary to determine the motor torque in the pitch motion reduction controller 300.

Thus, the pseudo-integral performing device 250 may perform pseudo-integral rather than pure integral such that the pitch rate estimation device 200 according to an exemplary embodiment prevents the integral result from diverging to an infinite value to indicate the result saturated to a specific value.

In the instant case, the pitch rate estimation device 200 may further include a pseudo-integral setting device 260 for setting a specific constant c causing the integral result of the pseudo-integral performing device 250 to be saturated.

To this end, the pseudo-integral setting device 260 may set various values to the specific constant c. The pseudo-integral setting device 260 sets the specific constant c to "1"

such that a maximum value of the pitch rate is 1 rad/s in the exemplary embodiment of the present invention, but not limited thereto.

The pitch motion reduction controller 300 may be configured to multiply a pitch reduction control gain $K_p$ by the estimation value $\hat{\dot{\theta}}$ of the pitch rate determined by performing the pseudo-integral in the pitch rate estimation device 200 to determine a value of the motor torque M driving the electric motor 400 in Equation 6 below.

$$M = K_p \times \hat{\dot{\theta}} \quad \text{[Equation 6]}$$

Accordingly, because the estimation value $\hat{\dot{\theta}}$ of the pitch rate, the accuracy of which is improved by reflecting fluctuation in acceleration and deceleration in the pitch rate estimation device 200, in the value of the motor torque M determined by the pitch motion reduction controller 300, a required braking force of the electric motor 400 may be controlled in the direction of reducing the pitch motion.

In other words, a pitch response of a general vehicle in a state where pitch reduction control is not performed is represented as (a) of Equation 7 below. However, when a damping coefficient (a coefficient of the pitch rate $\dot{\theta}$ term) is increased like (b) of Equation 7 below by the pitch reduction control, damping may be generated while pitch control is performed in the direction of reducing motion when the motion occurs in the pitch direction such that attenuation of the system is increased. As a result, pitch motion near a resonance point may be greatly reduced.

$$(a)\ I\ddot{\theta} + c\dot{\theta} + k\theta = 0 \quad \text{[Equation 7]}$$

$$(b)\ I\ddot{\theta} + \left[c + \frac{h - \tan\phi_f l_f}{r} \cdot K_p\right]\dot{\theta} + k\theta = 0$$

Figure 4:
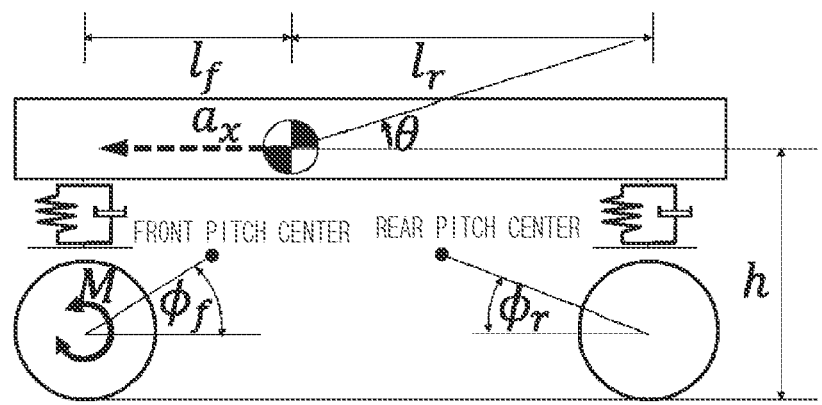
FIG. 4 is a schematic diagram illustrating a pitch response where pitch reduction control is performed according to various exemplary embodiments of the present invention.

In the instant case, in (a) of Equation 7 above, I denotes the moment of inertia, c denotes the attenuation coefficient, and k denotes the stiffness. In (b) of Equation 7 above, the damping coefficient, which is the coefficient of the pitch rate $\dot{\theta}$ term, indicates values obtained from a basic structure of the vehicle as shown in FIG. 4. Referring to FIG. 4, h denotes the height from the ground to the center of mass of the vehicle, $\phi_f$ and $\phi_r$ denote angles defined by segments, which connect the centers of the tires and suspension pitch centers, and the ground, $l_f$ denotes the distance from the center of the vehicle to the front wheel axle, and r denotes the radius of the tire. In FIG. 4, the motor torque M rotating (represented by the two-way arrow) the tire in both directions of braking or driving to drive the vehicle and the pitch angle θ moving upwards and downwards with respect to the direction of the longitudinal acceleration $a_x$ may be represented together.

Accordingly, the wheel speed $v_w$ and the longitudinal acceleration $a_x$ respectively measured by the wheel speed sensor 110 and the longitudinal acceleration sensor 120 are used in the exemplary embodiment of the present invention. Correction of removing the offset component and the gravity acceleration component caused by the inflection of the longitudinal acceleration may be performed to perform the pseudo-integral, and the estimation value of the pitch rate $\dot{\theta}$ may be determined. Thus, because it is possible to accurately estimate the pitch rate in the acceleration motion situation where the vehicle accelerates and decelerates and suitably determine the motor torque M using the result thereof, the effect of the pitch reduction control may be improved.

Figure 5:
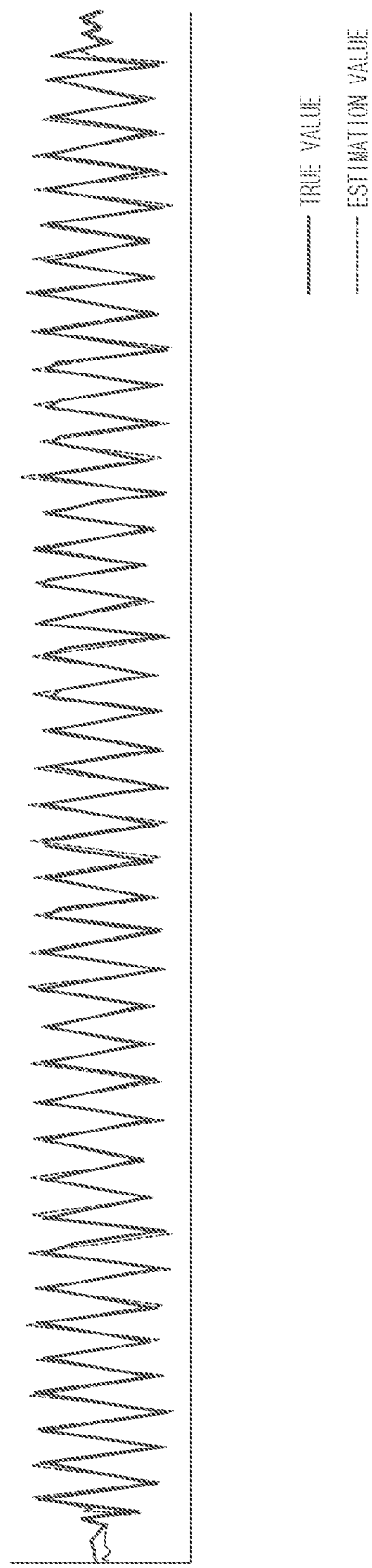
FIG. 5 is graph illustrating a pitch rate measurement value according to various exemplary embodiments of the present invention.

Seeing the example of the pitch rate estimation according to the exemplary embodiment with reference to FIG. 5, it may be verified that a real pitch rate true value (represented by the solid-line waveform in FIG. 5) measured while the vehicle is traveling on the wave road surface and the pitch rate estimation value (represented by the dotted-line waveform in FIG. 5) determined according to the exemplary embodiment indicate almost the same waveforms. It may be verified that the accuracy of the pitch rate estimation is quite superior.

Figure 6:
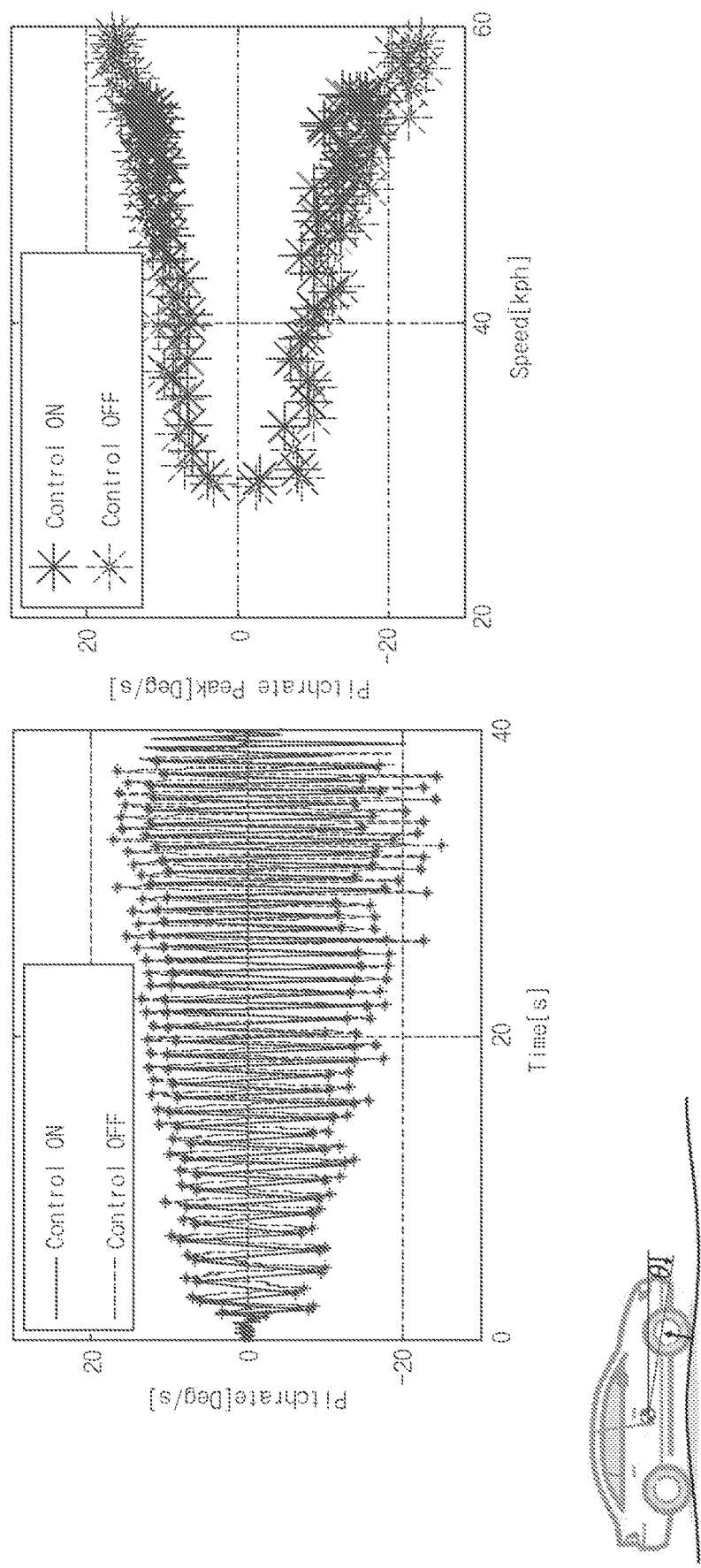
FIG. 6 is a drawing illustrating verification experiment results of a pitch reduction effect according to various exemplary embodiments of the present invention.

Furthermore, seeing an example of performing the pitch reduction control using the estimated pitch rate estimation value with reference to FIG. 6, when the motor torque is determined using the pitch rate estimation value and when the driving of the electric motor is controlled using the determined result, the peak value of the pitch rate is more reduced in the ON state where driving control is turned on than the OFF state where the driving control is turned off to verify an effect of the pitch reduction control.

Figure 7:
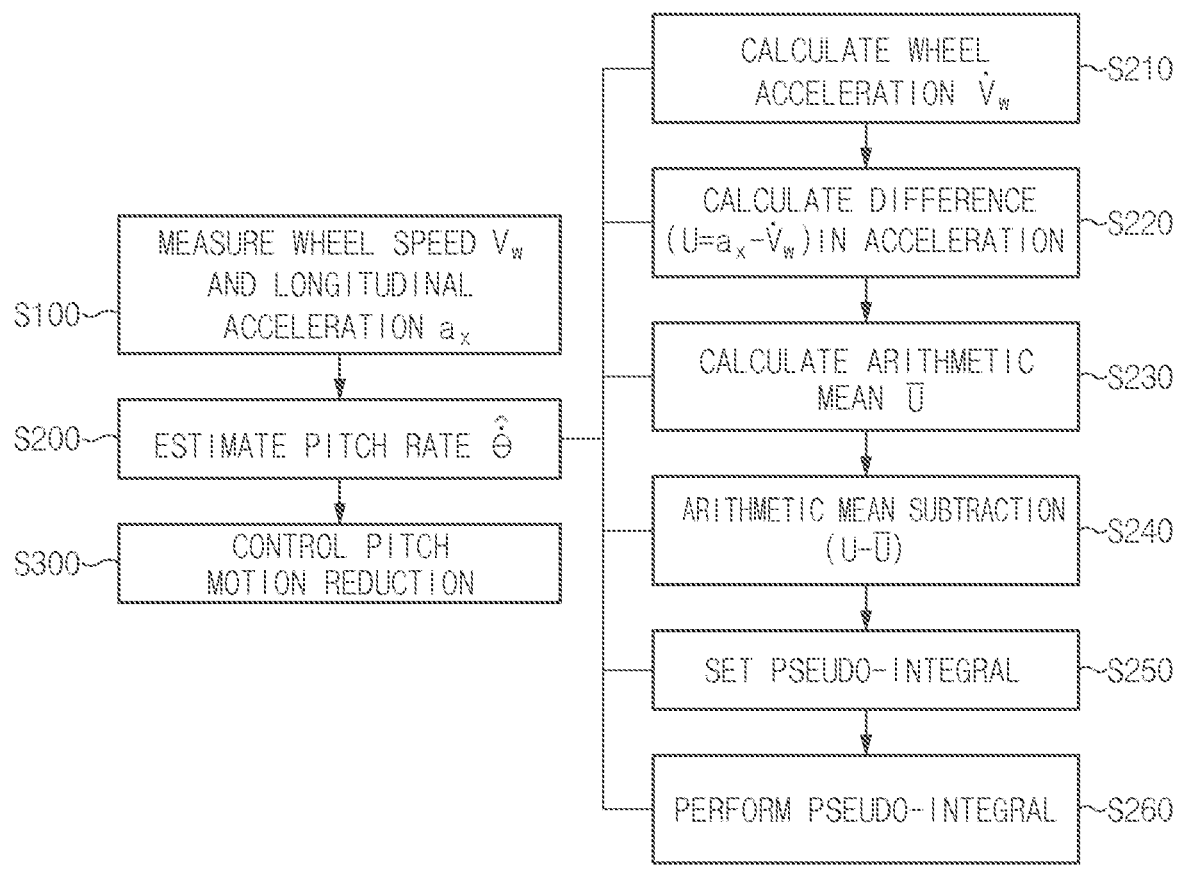
FIG. 7 is a drawing illustrating an operation of a method for controlling pitch reduction according to various exemplary embodiments of the present invention.
Figure 8:
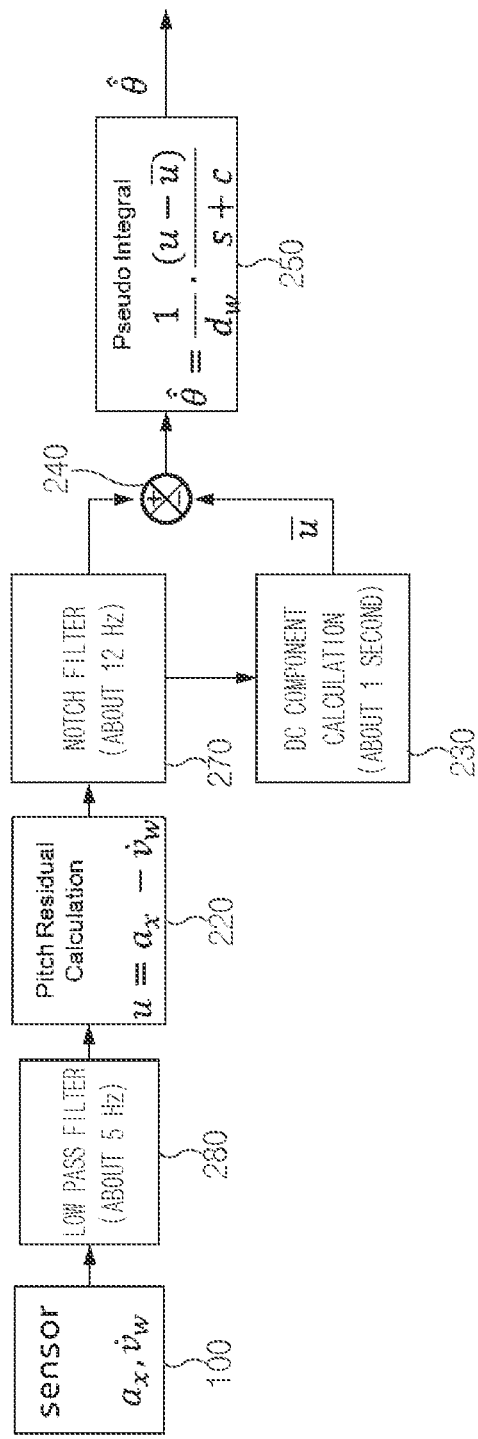
FIG. 8 is a drawing illustrating a pitch rate estimation process according to various exemplary embodiments of the present invention.

A description will be provided of a method for controlling pitch reduction according to various exemplary embodiments of the present invention with reference to FIGS. 7 and 8.

FIG. 7 is a drawing illustrating an operation of a method for controlling pitch reduction according to various exemplary embodiments of the present invention. FIG. 8 is a drawing illustrating a pitch rate estimation process according to various exemplary embodiments of the present invention.

Referring to FIGS. 7 and 8, the method for controlling the pitch reduction according to various exemplary embodiments of the present invention may include measuring (S100) a wheel speed and a longitudinal acceleration of a vehicle which is traveling, performing (S200) pseudo-Integral of a difference between a wheel acceleration determined from the wheel speed and the longitudinal acceleration to determine an estimation value of a pitch rate, and generating (S300) a control command for implementing a motor torque determined based on the determined estimation value of the pitch rate and transmitting the control command to an electric motor of the vehicle.

In operation S100, the wheel speed $v_w$ measured by a wheel speed sensor provided in the vehicle and the longitudinal acceleration $a_x$ measured by a longitudinal acceleration sensor provided in the vehicle may be received from the wheel speed sensor and the longitudinal acceleration sensor to use them as data for estimating a pitch rate generated by a pitch motion.

Furthermore, operation S200 may include differentiating (S210) the wheel speed $v_w$ to determine the wheel acceleration $\dot{v}_w$.

Furthermore, operation S200 may further include performing (S220) pitch residual determination of subtracting the wheel acceleration $\dot{v}_w$ from the longitudinal acceleration $a_x$ to determine a difference u in acceleration. In the instant case, the determined difference in acceleration may be represented as Equation 4 above.

In the instant case, the longitudinal acceleration $a_x$ may be acceleration where the center of mass of the vehicle body moves, which may be measured in a state where the longitudinal acceleration includes a component caused by the pitch motion the vehicle which is traveling suffers. Thus, in operation S220, the wheel acceleration $\dot{v}_w$ may be subtracted from the longitudinal acceleration $a_x$ to obtain an acceleration component caused by the pitch motion.

Furthermore, operation S200 may further include passing the result of the difference u in acceleration determined in operation S220 through a notch filter of a specific frequency band to remove a component caused by vibration in a vertical direction of the tire.

As shown in FIG. 8, it is obvious that operation S200 may further include passing the longitudinal acceleration $a_x$ and the wheel acceleration $\dot{v}_w$ through a low pass filter to remove noise in advance.

Furthermore, operation S200 may further include determining (S230) an arithmetic mean $\bar{u}$ for the difference in acceleration during a certain interval.

Accordingly, in operation S230, DC component determination of the arithmetic mean $\bar{u}$ for the difference in acceleration may be performed to obtain elements caused by a DC offset of the longitudinal acceleration sensor itself and a gravity acceleration component caused by an error where the longitudinal acceleration sensor is mounted, driving on a slope road, or the like.

Furthermore, operation S200 may further include subtracting (S240) the arithmetic mean $\bar{u}$ from the difference u in acceleration.

In other words, both of a phenomenon caused by the pitch motion the vehicle currently suffers and a phenomenon caused by the DC offset of the sensor or the gravity acceleration component when there is not pitch motion may be reflected in the difference u in acceleration determined based on the measurement value of the sensor.

Thus, in operation S240, correction (u−$\bar{u}$) of subtracting the arithmetic mean $\bar{u}$ for a difference between the longitudinal acceleration and the wheel acceleration measured over a relatively wide interval where there is no pitch motion (it is exemplified as about 1 second in FIG. 8, but not limited thereto) may be performed such that only an acceleration component caused by the pitch motion may be integrated.

Furthermore, operation S200 may further include performing (S260) pseudo-integral of the result of subtracting the arithmetic mean $\bar{u}$ for the difference between the longitudinal acceleration and the wheel acceleration from the currently measured difference u between the longitudinal acceleration and the wheel acceleration, dividing the integral result by a distance $d_w$ in a vertical direction from the center of the wheel to the longitudinal acceleration sensor to determine the estimation value $\hat{\theta}$ of the pitch rate.

In the instant case, to prevent the integral result from diverging to an infinite value when the pitch acceleration $\ddot{\theta}$ is determined in a form of pure integral, in S260, pseudo-integral may be performed rather than pure integral to determine a result saturated to a specific value when divergence is performed.

Thus, in Equation 5 above where the integral result indicates the estimation value $\hat{\theta}$ of the pitch rate, while the integral is represented in a form of a transfer function, it may be represented in the form (1/(s+c)) of adding an exponential function component in a time domain, rather than in the form (1/s) of referring to pure integral.

Furthermore, operation S200 may further include setting (S250) a value where the integral result of performing the pseudo-integral may be saturated to a specific constant c. In the instant case, the specific constant c represented in the pseudo-integral may be to perform integral by adding the exponential function component in the time domain, which may indicate the result saturated to a specific value by the exponential function to avoid indicating the integral result in the form of divergence.

Such a specific constant c may be set by a tuning element of the vehicle. The specific constant c is set to "1" such that the maximum value of the pitch rate is 1 rad/c in the exemplary embodiment of the present invention, but it is obvious that the specific constant c may be set to another value without being limited thereto.

Furthermore, in operation S300, the pitch reduction control gain $K_p$ may be multiplied by the estimation value $\hat{\theta}$ of the pitch rate, which is determined by the pseudo-integral, to determine a value of the motor torque M driving an electric motor and a control command $T_{m-cmd}$ configured for implementing the determined value of the motor torque M may be generated to be transmitted to the electric motor.

Accordingly, because the estimation value $\hat{\theta}$ of the pitch rate, the accuracy of which is improved by reflecting fluctuation in acceleration and deceleration, is reflected in the determined value of the motor torque M, a required braking force of the electric motor may be suitably controlled in the direction of reducing the pitch motion by the accurately estimated pitch rate.

Various exemplary embodiments of the present invention may obtain a difference between a longitudinal acceleration and a wheel acceleration, which is an integral target, using the wheel speed and the longitudinal acceleration, respectively measured by the wheel speed sensor and the longitudinal acceleration sensor and may perform pseudo-integral of the difference to determine an estimation value of the pitch rate $\dot{\theta}$, thus accurately estimating the pitch rate in an acceleration motion situation where the vehicle accelerates and decelerates and suitably determining the motor torque M using the result to faithfully reduce pitch motion in the acceleration and deceleration situation of the vehicle.

Furthermore, of the present invention an exemplary embodiment of the present invention may correct an offset component and a gravity acceleration component caused by inflection of the longitudinal acceleration and may perform pseudo-integral of the corrected value to determine an estimation value of the pitch rate $\hat{\theta}$, thus preventing the integral result from being inaccurate or diverging due to the offset component or the gravity acceleration component of the sensor to accurately estimate the pitch rate.

In addition, various effects ascertained directly or indirectly through the present invention may be provided.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

In addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling pitch reduction, the apparatus comprising:
   a memory storing program instructions; and
   a processor configured to execute the program instructions, the program instructions when executed configured to:
   measure, by using a sensor device, a wheel speed $v_w$ and a longitudinal acceleration $a_x$ of a vehicle;
   perform, by using a pitch rate estimation device, pseudo-integral of a difference between a wheel acceleration $\dot{v}_w$ determined from the wheel speed $v_w$ and the longitudinal acceleration $a_x$ to determine an estimation value $\hat{\dot{\theta}}$ of a pitch rate $\dot{\theta}$; and
   generate, by using a pitch motion reduction controller, a control command for implementing a motor torque in which the determined estimation value $\hat{\dot{\theta}}$ of the pitch rate $\dot{\theta}$ is reflected and transmit the control command to an electric motor of the vehicle,
   wherein the program instructions when executed are further configured to:
   determine, by using an acceleration difference determining device included in the pitch rate estimation device, a difference u in acceleration by subtracting the wheel acceleration from the longitudinal acceleration; and
   determine, by using an arithmetic mean calculating device included in the pitch rate estimation device, an arithmetic mean $\bar{u}$ for the difference u in acceleration during a predetermined interval.

2. The apparatus of claim 1, wherein the program instructions when executed are further configured to:
   measure, by using a wheel speed sensor included in the sensor device, the wheel speed $v_w$ of the vehicle; and
   measure, by using a longitudinal acceleration sensor included in the sensor device, the longitudinal acceleration $a_x$ of accelerating or decelerating the vehicle by acting parallel in a direction where the vehicle is traveling.

3. The apparatus of claim 1, wherein the program instructions when executed are further configured to:
   differentiate, by using a wheel acceleration determining device included in the pitch rate estimation device, the wheel speed $v_w$ to determine the wheel acceleration $\dot{v}_w$.

4. The apparatus of claim 1, wherein the program instructions when executed are further configured to: pass, by using a notch filter included in the pitch rate estimation device, through a result of the difference u in acceleration determined by the acceleration difference determining device through a predetermined frequency band to remove a vibration component of the band.

5. The apparatus of claim 1, wherein the program instructions when executed are further configured to: subtract by using an arithmetic mean subtracting device included in the pitch rate estimation device, the arithmetic mean for the difference in acceleration from the difference in acceleration.

6. The apparatus of claim 5, wherein the program instructions when executed are further configured to: perform, by using a pseudo-integral performing device included in the pitch rate estimation device, pseudo-integral of a result (u−$\bar{u}$) of subtracting the arithmetic mean $\bar{u}$ for the difference in acceleration from the difference u in acceleration in Equation below and divide a result of the pseudo-integral by a distance $d_w$ in a vertical direction from a center of a wheel of the vehicle to a longitudinal acceleration sensor to determine the estimation value $\hat{\dot{\theta}}$ of the pitch rate $\dot{\theta}$, $$\hat{\dot{\theta}} = \frac{1}{d_w} \times \frac{(u-\bar{u})}{s+c}. \qquad \text{Equation}$$

7. The apparatus of claim 6, wherein the program instructions when executed are further configured to: set, by using a pseudo-integral setting device included in the pitch rate estimation device, a value where the result of the pseudo-integral in the pseudo-integral performing device is saturated to a specific constant c.

8. The apparatus of claim 1, wherein the program instructions when executed are further configured to: multiply, by using the pitch motion reduction controller, a pitch reduction control gain $K_p$ by the estimation value $\hat{\dot{\theta}}$ of the pitch rate $\dot{\theta}$ determined by performing the pseudo-integral in the pitch rate estimation device to determine a value of the motor torque to drive the electric motor.

9. A method of controlling pitch reduction, the method comprising:
   measuring a wheel speed $v_w$ and a longitudinal acceleration $a_x$ of a vehicle which is traveling;
   performing pseudo-integral of a difference between a wheel acceleration $\dot{v}_w$ determined from the wheel speed $v_w$ and the longitudinal acceleration $a_x$ to determine an estimation value $\hat{\dot{\theta}}$ of a pitch rate $\dot{\theta}$; and
   generating a control command for implementing a motor torque determined based on the determined estimation value $\hat{\dot{\theta}}$ of the pitch rate $\dot{\theta}$ and transmitting the control command to an electric motor of the vehicle,
   wherein the determining of the estimation value of the pitch rate further includes:
      determining a difference u in acceleration by subtracting the wheel acceleration from the longitudinal acceleration, and
      determining an arithmetic mean $\bar{u}$ for the difference in acceleration during a predetermined interval.

10. The method of claim 9, wherein the measuring of the wheel speed and the longitudinal acceleration includes:
   receiving the wheel speed $v_w$ measured by a wheel speed sensor provided in the vehicle and the longitudinal acceleration $a_x$ measured by a longitudinal acceleration sensor provided in the vehicle from the wheel speed sensor and the longitudinal acceleration sensor, respectively.

11. The method of claim 9, wherein the determining of the estimation value of the pitch rate includes:
   differentiating the wheel speed $v_w$ to determine the wheel acceleration $\dot{v}_w$.

12. The method of claim 9, wherein the determining of the estimation value of the pitch rate further includes:
   passing through a result of the determined difference u in acceleration through a notch filter of a predetermined frequency band to remove a vibration component of the band.

13. The method of claim 9, wherein the determining of the estimation value of the pitch rate further includes:
   subtracting the arithmetic mean $\bar{u}$ for the difference in acceleration from the difference u in acceleration.

14. The method of claim 13, wherein the determining of the estimation value of the pitch rate further includes:
   performing pseudo-integral of the result $(u-\bar{u})$ of subtracting the arithmetic mean for the difference in acceleration from the difference in acceleration in Equation below and dividing a result of the pseudo-integral by a distance $d_w$ in a vertical direction from a center of a wheel of the vehicle to a longitudinal acceleration sensor to determine the estimation value $\hat{\dot{\theta}}$ of the pitch rate $\dot{\theta}$, $$\hat{\dot{\theta}} = \frac{1}{d_w} \times \frac{(u-\bar{u})}{s+c}. \quad \text{Equation}$$

15. The method of claim 14, wherein the determining of the estimation value of the pitch rate further includes:
   setting a value where the result of the pseudo-integral is saturated to a specific constant c.

16. The method of claim 9, wherein the generating of the control command and the transmitting of the control command to the electric motor of the vehicle include:
   multiplying a pitch reduction control gain $K_p$ by the estimation value $\hat{\dot{\theta}}$ of the pitch rate $\dot{\theta}$ determined by the pseudo-integral to determine a value of the motor torque driving the electric motor; and
   generating the control command configured for implementing the determined value of the motor torque and transmitting the control command to the electric motor.

* * * * *